Oct. 13, 1970          A. COUCOULAS          3,533,155
BONDING WITH A COMPLIANT MEDIUM
Filed July 6, 1967                    5 Sheets-Sheet 1

INVENTOR
A. COUCOULAS
BY  MARN & JANGARATHIS
ATTORNEYS

United States Patent Office 3,533,155
Patented Oct. 13, 1970

3,533,155
BONDING WITH A COMPLIANT MEDIUM
Alexander Coucoulas, Bridgewater, Township, Somerset County, N.J., assignor to Western Electric Company, Incorporated, New York, N.Y., a corporation of New York
Filed July 6, 1967, Ser. No. 651,411
Int. Cl. B23k 31/02
U.S. Cl. 29—471.1       25 Claims

ABSTRACT OF THE DISCLOSURE

The bonding of two workpieces by ultrasonic or thermocompression techniques requires the use of a rigid bonding tip or ram to transmit the bonding energy, whether it be vibratory, mechanical and/or thermal. In time, such a rigid medium is subject to wear, to misalignment and to pickup of material from the workpieces, the latter causing the upper workpiece to stick to the tip. Further, such a rigid medium cannot be used reliably, to make a number of bonds simultaneously, because minor size differences in the workpieces can prevent a good couple for energy transmission from being established to every workpiece. It has been discovered that a compliant or deformable medium can be employed to hold the workpieces during bonding. By deforming around the workpieces, the compliant medium eliminates the problem of size differences, as well as wear, misalignment and the like, and a good bond is achieved in each instance. In one aspect, the bonding energy is transmitted through the compliant medium to make the bond. In a second aspect, the bonding energy is transmitted through the support for the workpieces. The quality of individual bonds is improved because, for a given set of bonding conditions, there is less deformation of the workpieces than with conventional techniques. The invention is particularly applicable to the bonding of beam-lead transistors and integrated circuits to substrates, to bonding a plurality of leads to integrated circuit and thin film devices, and to bonding brittle single crystal chips to substrates.

BACKGROUND OF THE INVENTION

1. Field of the invention

This invention relates generally to bonding and, more particularly, it relates to the bonding of a first workpiece to one or more second workpieces. The first workpiece may comprise a thin film component of integrated circuit mounted on an insulating substrate, a printed circuit board, or the like. The second workpiece may comprise one or more small wires, the leads from a transistor or integrated circuit device, a small, brittle crystal, or the leads of a beam-lead transistor or integrated circuit device. The invention has application to the bonding of workpieces other than the above-described types, but since it is particularly adapted for such workpieces it will be described with reference thereto.

As electronic devices and circuits have become smaller, the problems associated with making electrical and, where necessary, ohmic contact thereto have increased. The bonding of discrete devices to substrates and the making of ohmic contact to emitter and collector regions required development of special plating techniques, brazing alloys and so forth, but once the device was packaged it could be connected into a circuit by conventional techniques. The bonding of chips cut from single crystals of silicon, germanium and the like to substrates presents many problems, due mainly to the brittleness of these materials. Brazing or soldering techniques are generally employed, though ultrasonic methods are also known.

The bonding of leads to thin film devices also created special problems. The substrates were brittle and tended to crack. The leads tended to work harden and fail in service. Damage to the thin film could occur. Two methods of bonding found favor in this service. One was ultrasonic bonding, where the substrate is clamped on an anvil, the lead is positioned thereon, and the bonding tip of an ultrasonic horn is used to clamp the lead in place. A brief application of ultrasonic vibratory energy in a direction parallel to the substrate surface makes the bond. The wiping motion of the lead surface over the substrate surface breaks up films thereon to provide nascent bonding surfaces. The heat generated by friction at the interface combined with the nascent surface, produces a true metallurgical bond.

The second method of attaching leads to thin film contact areas is thermocompression bonding. In this method, a combination of thermal and mechanical energy, in the form of heat and pressure supplied, for example, by a heated ram, are used to make the bond. The technique used is similar to ultrasonic bonding except that the heated ram is used instead of an ultrasonic bonding tip, to transmit the energy to the workpieces. Good metallurgical bonds can be made in this manner. As used herein, the term, "mechanical energy" will be understood to include both ultrasonic vibratory energy and ram pressure.

In bonding by either the ultrasonic or thermocompression method, making each bond is essentially a separate operation, and efforts to make a number of bonds simultaneously have not been commercially successful (as used herein, "simultaneous" refers to bonding a number of leads to a single substrate at the same time; ganged bonding devices can of course be assembled to bond individual leads to separate substrates at discrete bonding stations, but this saves little time or labor). While the design of a heated ram big enough to make several bonds presents no problem, and an ultrasonic bonding tip with the same capability presents no insurmountable difficulties, variations in the size of the lead wire or the balled tip thereof, will prevent such devices from reliably bonding each lead to each substrate. Thus, if 10 leads are positioned on a substrate and 8 of them are exactly the same size but 2 are 10–20% smaller, a flat ram or bonding tip will make only 8 bonds. Or, if enough pressure is applied to contact all 10 leads, 8 of them will be deformed too much, resulting in a weak or "killed" bond. In another case, the leads may be of exactly equal size, but the thickness of the metallic land areas on the substrates may vary, the thickness of the substrate may vary, or the bonding tip may be worn or misaligned, sufficiently to prevent the energy source (ram or ultrasonic bonding tip) from making an energy-transmitting couple with each lead. Thus, the problem is not bonding leads simultaneously per se, but rather reliably bonding every lead in a group, simultaneously, every time. Even with the most sophisticated quality control techniques and the closest tolerances obtainable, simultaneous bonding of a number of leads has not proven to be reliable or economic.

Workers in the field have heretofore attempted to apply the same techniques, ultrasonic and thermocompression but mainly the latter, to the bonding of beam-lead devices to substrates. This presents the same kind of problems, but to a much greater degree. Because the leads are so small, it is very easy to "kill" a bond by too much deformation. An especially difficult problem in the bonding of beam lead devices is referred to as "bugging." The simultaneous application of pressure to all of the leads of such a device at their outer ends tends to cause the inner ends of the leads and the device itself to move upwardly, away from the substrate, giving it the appearance of a small bug. When this happens, the device is highly stressed, which can lead to cracking, altered electrical characteristics, or bond failure. The latter may occur immediately, or may be delayed. Other problems associated with bonding these devices result from their small size; it is necessary to use a microscope to even see the device adequately. Special tools must be used to position the device on the substrate and position the leads directly under the bonding ram or tip. As an example, a highly skilled worker will be able to bond a 16-lead integrated circuit device to a substrate in anywhere from three quarters to one and a half hours, depending on how "fresh" he is. Such work demands both skill and concentration, and is fatiguing. Needless to say, the reject rate is high.

The simultaneous bonding of all of the beam leads in a given device has heretofore been commercially impractical. A simple beam lead device may have 12 or 16 leads, each 5 mils by ½ mil. What is believed to be the closest tolerance obtainable on the thickness of a plate slice of silicon is ±0.2 mils (0.0002 in.). While this is a very close tolerance indeed, in absolute terms, its amounts to ±40% of the desired lead thickness. Thus, even if the bonding tip is perfectly flat and perfectly aligned, a fact which is not always true, it is quite possible that it will not simultaneously couple with all of the leads, and bonding will be incomplete. The above-mentioned problem of "bugging," and the ease with which leads may be "killed" by too much deformation, add to these difficulties.

Lastly, while there exist methods of checking the existence of a bond, i.e. electrical testing, the only reliable method of determining the strength of a bond is by mechanically testing it to failure, i.e. the well-known shear peel test. There is no qualitative non-destructive method of estimating bond strength.

2. Description of the prior art

The techniques of ultrasonic and thermocompression bonding, particularly as applied to bonding leads to substrates, are well known in the art. In the field of electric welding, the use of flexible electrodes and electrodes mounted on resilient supports was proposed many years ago (see, for example, U.S. Pat. No. 475,191 and No. 2,226,424).

Gang welding at several, spaced welding stations was proposed in U.S. Pat. No. 3,053,125. The patentees place the workpieces on movable supports located under each bonding head, then move the support up to clamp the workpieces in place. The welding heads are located on a long rod at points of antinodal vibration. The rod is connected to an ultrasonic transducer, and a single application of ultrasonic energy will make a single bond at each welding station. There is no known prior art utilizing a compliant medium in connection with ultrasonic or thermocompression bonding.

There has been proposd, however, a method of soldering connections to a plurality of flexible cables at one time. In this method, the portions of the conductors desired to be bonded are coated with solder, and the cable assembly is laid over the contact elements, which rest on a rigid support. A Teflon (trademark) sheet is laid over the cable insulation and a quartz plate is laid on top of the sheet. A tungsten halogen lamp provides infrared heat energy which passes through the quartz, Teflon and insulation (all of these members being more or less transparent to infrared radiation) which melts the solder and makes the bond. The quartz acts as a heat sink and a clamp (see Broyer and Mammel: "Flex Cable Interconnections Mass Bonded With Infrared," Proceedings, NEP/CON, 67, July 1967).

OBJECTS OF THE INVENTION

It is a general object of the present invention to provide an improved method of bonding metallic surfaces of workpieces.

Another object of the present invention is to provide an improved method of bonding leads to substrates.

A further object of the present invention is to provide an improved method of bonding a plurality of leads to a substrate simultaneously.

Still another object of the invention is to provide a method of bonding brittle single crystal chips to substrates with heat and mechanical energy.

Yet another object of the invention is to provide a method of ultrasonic or thermocompression bonding which produces bonds of improved quality when compared to conventional methods of this type.

A still further object of the invention is to provide a novel method of nondestructively checking a bond between workpieces.

Yet another object of the invention is to provide an improved method for simultaneously bonding all of the leads of a beam-leaded semiconductive device to the metallic land areas of a substrate.

Still another object of the invention is to provide a method of bonding beam-lead devices to substrates which avoids "bugging" and killing of leads.

Still another object of the invention is to provide an improved method of bonding leads to substrates which is relatively fast, highly reliable and economic, even with substantial variations in lead size.

Still a further object of the present invention is to provide a novel lead frame structure useful in achieving the foregoing objects.

Another object of the invention is to provide a novel jig assembly useful in carrying out the method of the invention.

Still another object of the present invention is to provide a novel apparatus for achieving the foregoing objects.

Various other objects and advantages of the invention will become clear from the following summary and detailed description thereof, and the novel features will be particularly pointed out in connection with the appended claims.

SUMMARY OF THE INVENTION

In essence, the present invention is based, at least in part, on the discovery that the use of a compliant or deformable medium to hold the workpieces has many significant advantages in bonding, and that sufficient thermal and/or mechanical energy can be transmitted through or absorbed by such a medium to effect a good bond between the workpieces.

Understanding of the invention will be facilitated if, prior to considering embodiments of the invention, some attention is given to the transmission of energy through a compliant or deformable medium, which is considered to be one of the more surprising aspects of the invention.

While a compliant medium may be easily or difficult to deform, it will transmit pressure while absorbing energy. Thus, if a 100 pound weight is placed on a 1 inch cube of steel resting on a rigid support, the steel will deform very little and the pressure on the support will be 100 p.s.i. If the cube is made of hard rubber rather than steel, the deformation will be much greater but the pressure on the support will still be 100 p.s.i. The energy of deformation in each instance is represented by the distance moved by the weight lower than one inch. If the weight squeezed the rubber to a height of ¾ inch, for example, the energy of deformation would be $(1\frac{3}{4}) \times 1\frac{1}{12} \times 100 = 2.09$ foot pounds. The potential energy represented by the 100 p.s.i. pressure on the support is still available to perform work.

If a second piece of deformable material is placed between the rigid support and the hard rubber cube, there will be a relative deformation of both substrates. Naturally, if the second material is also a cube of hard rubber, the deformation of both pieces will be equal. The distribution of deformation between two dissimilar materials can be determined from the stress-strain curve of each material. That is, under a given stress, the strain of each material can be read directly from the curve. This is not limited by the points on the curves where the mode of deformation changes from elastic to plastic (i.e. the elastic limit). Thus, if a cube of material A is resting on a cube of material B which is, in turn, resting on a rigid support, and a one hundred pound weight is placed on cube A, the deformation of both may be elastic or plastic, or one may deform elastically while the other deforms plastically. In any case, the behavior of the respective materials can be predicted from the stress-strain curve.

From the foregoing it is believed to be clear that under the influence of pressure (i.e., mechanical energy) alone, one compliant (or deformable) material can deform another deformable material.

The above discussion was concerned only with two cubes of the same size. If, in place of the 1 inch cube of material B, there is substituted two ¼ × ¼ × 1 in. bars, the pressure on each bar will be 200 p.s.i. since the total pressure must in this instance be transmitted through ½ in.$^2$ of surface. However, the deformation of material A will be considerably different. With two equal cubes, both materials will tend to flatten, i.e. bulge outwardly on the sides, where they are not confined. If cube A is resting on the two bars presenting an aggregate surface area of ½ in.$^2$, however, cube A will tend to deform downwardly, between or around the bars. If, now, in place of cube A there is substituted a round rod of ½ in. diameter laid across the two bars, the stress-strain situation changes radically. The area of contact between rod A and bars B is very small, so the stress (for the same 100 pound weight) must be very large. This will cause an appropriate increase in the strain (deformation) of both materials. In other words, it is the stress at the interface, rather than the total force applied, which determines the deformation of both materials. Thus, by controlling the geometry of the two materials, a relatively small force can be made to cause a relatively large deformation.

The mode and amount of deformation will also be radically influenced by the application of thermal energy. This is also predictable from the stress-strain curve of the chosen materials at the specified temperature.

In sumary, the following factors can be used to control relative deformation between the two bodies: (1) Selection of materials; (2) Total mechanical energy applied; (3) Geometry of the pieces; and (4) Application of heat.

The foregoing principles are directly applicable to the present invention, and a simple example will illustrate this. It is desired to bond a 16-lead beam lead device (gold leads) to the gold land areas on a substrate, using a ram pressure of 30 pounds at 400° C. The leads are material B, the land areas are the rigid support, and material A is what is referred to herein as the compliant medium. To select a suitable compliant medium, the stress-strain curve of gold at 400° C. is plotted, preferably on a log-log plot where $\sigma_0$, the yield point, is on the ordinate, and the slope of the curve is the strain hardening index. From this plot, the stress necessary to achieve any degree of deformation of the gold can be determined. If 50% deformation ($\epsilon_1$) of the lead is desired, a particular stress, $\sigma_1$, will achieve it. If the compliant medium is twice as thick as the lead, it will only deform 25% in deforming the lead 50%, so any material having a stress-strain curve which deforms 25% ($\epsilon_2$) at the desired stress ($\sigma_1$) is a suitable medium. In this instance, 2024 aluminum is a satisfactory medium. Having selected a medium, the geometry is considered. The substrates rests on an anvil, the device is placed thereon, and the compliant aluminum frame, covering only the leads, is laid thereover. The heated ram is brought down under a 30 pound (absolute) load. The pressure at the ram-aluminum interface is found to be about 2000 p.s.i. This is below the yield point of this alloy at 400° C. However, the pressure at the aluminum-lead interface, which is a much smaller area, is in excess of 100,000 p.s.i., above the yield point of both metals, and deformation proceeds here. When the aluminum has deformed around the leads and touches the substrate (as described in detail hereinbelow), the area of contact increases (and the pressure decreases) until it is the same as the area of the ram-aluminum interface, i.e., the pressure drops to about 2000 p.s.i., and deformation stops.

In the bonding of leads to substrates by conventional thermocompression or ultrasonic techniques, it was necessary that the lead be substantially deformed against the substrate to achieve good bonding, although deformation per se did not necessarily mean a good bond was made. With the method of the present invention, the compliant medium will deform in all instances, but deformation of the workpieces, by which in this instance is meant, plastic deformation after the bond is made, may be so slight as to be essentially invisible. This is most dramatically illustrated by the ultrasonic bonding of chips cut from single crystal slices of silicon or other brittle crystals. Any deformation of such materials will result in fracture; they just do not deform, at least in the ordinary sense of the word. Yet, they are successfully bonded to substrates by the method of the invention with heat and ultrasonic energy. All of the deformation is apparently confined to the plated surface adjacent the substrate. Similarly, beam lead devices may be bonded to substrates by the method of the invention without significant visible deformation.

In a first embodiment of the present invention, the two workpieces are positioned on a supporting anvil or table and the complaint medium is placed over the desired bond area. In this embodiment, deformable metals having tough, adherent oxide surface films are preferred as the complaint medium, and thermocompression is the preferred mode of bonding. Any nonwetting surface should be satisfactory, though. A heated ram is used to deform the complaint medium and simultaneously make the bond between the workpieces. The oxide film prevents the complaint medium from bonding to either of the workpieces (it is assumed herein that all bond surfaces are free of surface films or contaminants). While a heated ram is the normal mode of applying heat and pressure in thermocompression bonding, it will be understood that the heat can be supplied in a variety of ways: a hot gas may be passed around the bond area, the anvil may be heated, resistance heating can be employed, etc.

A surprising aspect of this embodiment of the invention is that the plastically deformed complaint medium has, after bonding, a perfect replica of the bond area impressed therein which can be used to determine the fact that a bond has been made. It has been discovered that, when a good bond has been made, this replica bears every detail thereof, including even surface imperfections, but where the bond is a poor one, the replica is also poor and has a much different appearance. Further, the complaint medium may be formed into a lead frame which holds one or a large number of devices in a manner which facilitates positioning of both components on the substrate. The use of a complaint plastically deformable medium is also most desirable for making reliable bonds on a mass production basis. The devices, for example beam lead integrated circuits, are mounted a few centimeters apart on a ribbon of aluminum as the complaint medium. For small (i.e. 3-lead) devices, attachment to the ribbon may be by adhesive. With larger devices now available, it is preferred to have apertures or windows in the ribbon large enough to retain the body of the device. The aluminum is provided with indexing means such as edge markings or holes, and the devices are positioned on the ribbon in an exact relation thereto. The substrate is positioned under the ram, the ribbon or tape is indexed in position, and the bond is made. A new substrate is placed under the ram (which can be done automatically), the tape is advanced one space, and the next bond is made. Alignment of the ram, wear of the ram surface, and material pickup on the ram tip are eliminated as problems, because a "fresh" complaint medium is used to make each bond. The "used" tape bears a replica of each bond for checking purposes.

Bonds are also made by applying ultrasonic energy through a plastically deformable complaint medium, and this technique is preferred in bonding brittle chips of silicon or the like to substrates (as used herein, the terms "ultrasonic energy" or "ultrasonic vibratory energy" are intended to include vibratory energy of substantially any frequency, roughly, from 60 hz. into the kilohertz range). The chip ordinarily has both major surfaces metallized and plated before it is cut from the slice. The substrate is mounted on an anvil, the chip is positioned thereon, and a complaint medium, typically a piece of aluminum several times thicker than the chip, is placed thereon. Heat is applied for a fraction of a second and both heat and ultrasonic energy are applied for an additional fraction of a second. The heat softens the aluminum slightly and, with the application of ultrasonic energy, the aluminum deforms around the chip, again only slightly, but enough to "grab" the chip and establish an energy-transmitting couple. Within much less than one second, the chip is bonded to the substrate. Bonds have also been made with ultrasonic energy using Teflon (Trademark) as the compliant medium between the workpiece and the bonding tip.

In a second embodiment of the invention, the workpieces are again positioned on an anvil or table, but in this instance the table itself is capable of ultrasonic vibration in a direction parallel to the surface. A compliant medium is lowered over the bond area to clamp the workpieces together and ultrasonic energy is used to make the bond. Heat may be advantageously applied to the bond region through the complaint medium, thus reducing the amount of ultrasonic energy required to make the bond.

In this embodiment the compliant medium preferably deforms elastically, and is attached to the bottom of a plunger. It may be an organic material such as a silicone rubber or, alternatively, it may take the form of a plurality of spring-loaded pins mounted in a jig, the position of each pin corresponding to a single bond area. The use of such a jig is not generally preferred, however, and is confined to the bonding of relatively large devices.

Finally, the present invention includes a bonding machine capable of bonding workpieces in accordance with any of the above-described embodiments.

THE DRAWINGS

Understanding of the invention will be facilitated by referring to the following detailed description of the several embodiments, in conjunction with the accompanying drawings, wherein.

DESCRIPTION OF EMBODIMENTS

Figure 1A:
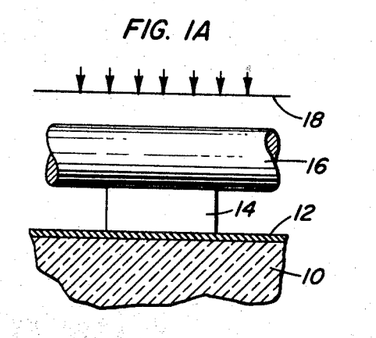
FIGS. 1A and 1B are side and end elevations, respectively, showing all parts in place for bonding a lead to a substrate by thermocompression bonding in accordance with the invention.
Figure 1B:
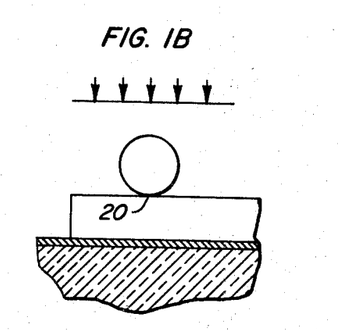
Figure 2A:
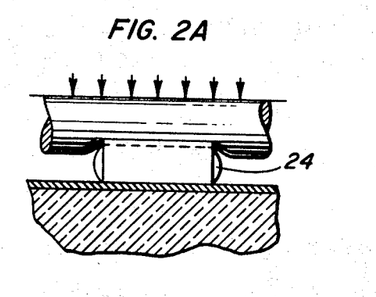
FIGS. 2A and 2B are similar to FIGS. 1A and 1B, showing all parts during thermocompression bonding in accordance with the invention.
Figure 2B:
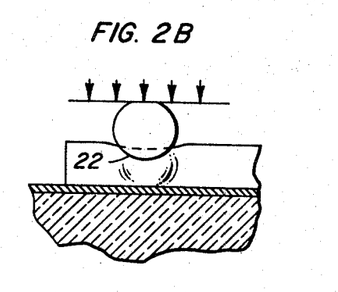
Figure 3A:
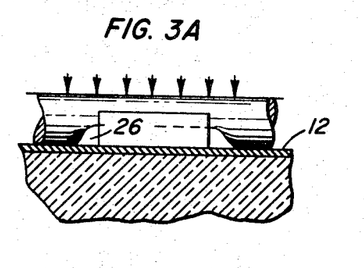
FIGS. 3A and 3B are similar to FIGS. 1 and 2, showall parts after thermocompression bonding is complete.
Figure 3B:
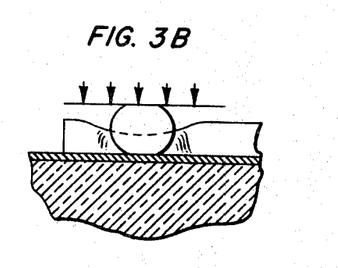

FIGS. 1–3 illustrate bonding of a single lead to a substrate by the first embodiment of the invention. An insulating substrate 10 having a metallic land area 12 on the surface thereof is placed on a rigid support (not shown). A lead 14 is placed over land area 12 at the desired bonding point. For purposes of illustration, it can be assumed that substrate 10 is a high alumina ceramic, and land area 12 and lead 14 are both gold. The compliant medium is in the form of a wire 16 of a film-forming metal such as aluminum. A heated ram 18 initially clamps the workpieces to the support and, as pressure is applied, wire 16 and lead 14 commence to deform, as shown in FIG. 2. In particular, the line of contact 20 between the two pieces becomes a zone of contact 22, and bulges 24 appear on the unconfined edges of lead 14. At the same time, wire 16 deforms around lead 14. When bonding is complete, as shown in FIG. 3, the initial bulges have been deformed into area 26, and wire 16 has deformed so as to completely cover the entire bond area on both workpieces. The flow of the lead metal in the area 26 against the land metal 12 contributes to the quality of the bond.

When bonding is complete, ram 18 is raised and wire 16 is removed. The existence of the bond can be checked by examination of the impression left in wire 16, which is an exact replica of the bond area. This is of course greatly preferable to the destructive shear-peel test.

As noted hereinabove, the wire 16 will not itself bond to the workpieces because of the tough oxide film on its surface. Since film-forming metals (aluminum, nickel, titanium, tantalum, etc.) always have such oxide films and the thickness thereo can be readily controlled by anodizing, they are preferred as the compliant medium in this embodiment. Other materials can be employed and parting materials used to prevent bonding of the medium to the workpiece, but parting materials will of course be avoided where they might present a contamination problem.

Since gold is a relatively soft metal, compared to aluminum, one might think that the wire 16 would cut right through lead 14 or "mash" it completely, but this is not the case. Successful bonds of gold leads have even been made using nickel as the complaint medium, which is even harder than aluminum. Of course, when selecting a compliant medium, persons skilled in the art will obviously avoid metals and alloys that would not deform under the bonding conditions.

As further noted hereinabove, bonds produced in the foregoing manner have been determined to be superior to bonds made by conventional ultrasonic and thermocompression techniques. This superiority is both statistical (i.e. the number of good bonds made per thousand) and absolute (i.e. bond strength in a shear-peel test). While not wishing to be bound to any particular theory of operation, it is believed that the reason for this superiority can be explained by reference to some of the fundamentals of ordinary thermocompression bonding.

It has been previously determined that, for a given ram pressure (i.e. load), there is a satisfactory range of bonding temperatures that will produce a good bond. Conversely, for a given bonding temperature, there exists a range of loads that will produce a good bond. This assumes a constant bonding cycle. As would be expected, the higher the load the lower the satisfactory teperature range, and vice versa. Expressed differently, it could be said that there is a range of total bonding energy which will produce a good bond, and this can be divided between mechanical and thermal energy in any desired way. If insufficient total bonding energy is applied, the lead will not adhere to the substrate (i.e. in a pull test, separation will occur at the interface). If too much bonding energy is applied, the lead will be "killed" (i.e., in a pull test, the lead will break). Prior workers have studied the geometry of various bonding tips at great length to overcome the "killing" problem, but to little avail.

In bonding with a compliant medium in accordance with the present invention, it has been determined that the upper limit of total bonding energy that produces a good bond is raised substantially. Thus, the problem of "killing" a bond is substantially reduced. This is in part explained by the fact that, to a lesser or greater extent, the compliant medium is deforming rather than the workpiece, but this fact does not explain the high strength of bonds produced. The actual mechanism of bonding at the interface is believed to be diffusion, regardless of the type of bonding employed. Diffusion is a time and temperature dependent process. The load-temperature relations discussed above assume a constant bonding time, but with compliant medium bonding, where "killing" the bond is not such a problem, a slightly longer bonding time can be employed. This allows for greater diffusion at the interface, and a strong and better bond results. It is to be emphasized that the interrelation between all of the various parameters of bonding is a complex one, and the foregoing is offered only as a reasonable explanation. The same fundamentals apply to ultrasonic bonding as to thermo-compression techniques, but the mechanisms at work are quite different. For examples, heat is generated by both internal and external friction and hysteresis, in addition to any external sources that might be used. However, the foregoing explanation is also reasonable where ultrasonic energy is employed.

Figure 4:
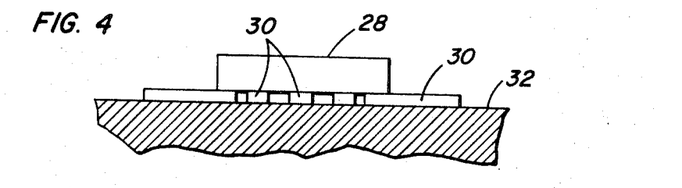
FIG. 4 is a side elevation of a beam lead device positioned on a substrate.

FIGS. 4–7 illustrates the bonding of a beam-lead integrated circuit device to a substrate in accordance with the first embodiment of the invention. As shown in FIG. 4, the device comprises a silicon chip 28 having gold leads 30 issuing therefrom. It rests on a substrate 32 having metallic land areas (not shown) under each lead.

Figure 5:
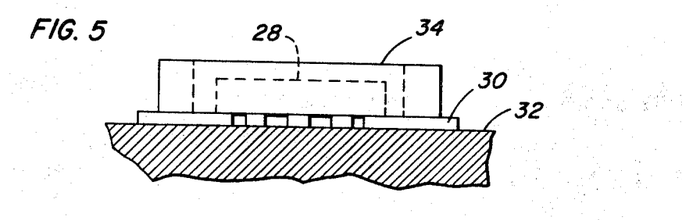
FIG. 5 is similar to FIG. 4 and shows the compliant medium in place.

As shown in FIG. 5, a hollow preform or lead frame 34 is placed over leads 30 and around device 28 preform 34 extends substantially above the top of device 28 so that, during bonding, the hot ram will not press upon device 28. Many such devices and particularly the more simple beam lead transistors, have substantial structural strength, and the compliant medium can be caused to deform around the entire device and the leads, thus eliminating the need for a hollow preform 34. This has the further advantage of eliminating any possibility of bending or "bugging" of the device, although this has not been a problem when bonding with a hollow, compliant preform.

Figure 6:
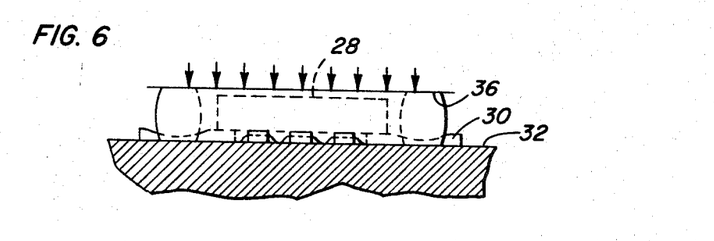
FIG. 6 is a side elevation of the assembly of FIG. 5 during thermocompression bonding in accordance with the invention.
Figure 7:
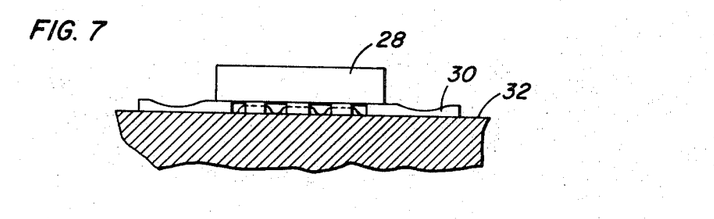
FIG. 7 is a side elevation of the device of FIG. 4 after bonding.

Bonding is illustrated in FIG. 6. A hot ram 36 is pressed down on the assembly, causing deformation of preform 34 and leads 30 in the same manner as described hereinabove in connection with FIGS. 1–3. It will be noted that preform 34 deforms in exact compliance with the leads even when they are very closely spaced. FIG. 7 illustrates the bonded device after removal of the preform.

The extent of deformation of the leads during bonding is apparently a function of the geometry of the compliant medium and the physical properties of the materials, more than anything else. FIGS. 1–3 and 4–7 illustrate two shapes of a compliant medium and two somewhat different lead deformations. Where the compliant medium is a sheet which covers essentially the entire lead right up to the device, bonds are made with little or no visible deformation of the lead. The obvious, if not entirely satisfactory, explanation for this is that the energy couple from the source of the interface is, relatively, a broad area one, and a good bond is made with little deformation other than at the interface. In the bonding of beam lead devices, it is preferred to use a solid sheet of the compliant medium which covers the entire device and the leads, when the device is strong enough. Ram pressure is applied overall, the medium deforms around the device and the leads, and makes good bonds. Any tendency toward "bugging" is manifestly impossible, since the device and the leads are subjected to the same forces.

The foregoing can be illustrated by a specific example of the bonding of a 16-lead beam leaded device to the Au/Ti land areas on a glass substrate. The compliant medium was 2024 aluminum 0.005 in. thick with a square 0.0535 in. hole punched therein. The device was positioned on the substrate and the aluminum was placed thereover, the hole just fitting over the body of the device. The ram was 718 stainless with a flat, Inconel tip heated by a 150 watt cartridge heater. Bonding was carried out for 1.5 seconds with a total ram pressure of about 48 pounds (3 pounds per lead) at a temperature of 400° C. Lateral deformation of the beams due to bonding was less than 10%. After bonding, the device could not be blasted loose with 400 p.s.i. compressed air. When a sharp probe was used to shear the device from the substrate, all 16 leads broke off and remained bonded to the substrate.

In general, it has been found that successful thermocompression bonds can be made in accordance with the invention at temperatures in the range of 350°–500° C., bonding cycles of 1 to even 5 seconds, and ram pressures of 30–50 pounds. It will be appreciated, however, that all of these parameters are related. At lower temperatures, for example, longer cycles are in order, and vice versa.

Figure 8:
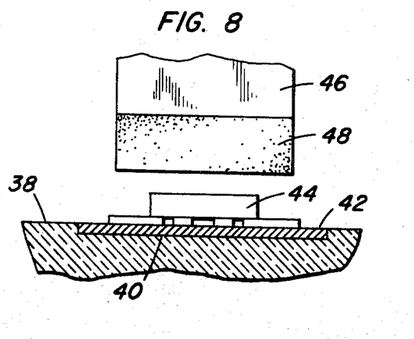
FIG. 8 is a side elevation showing a beam lead device on a substrate ready for ultrasonic bonding in accordance with another embodiment of the invention.
Figure 9:
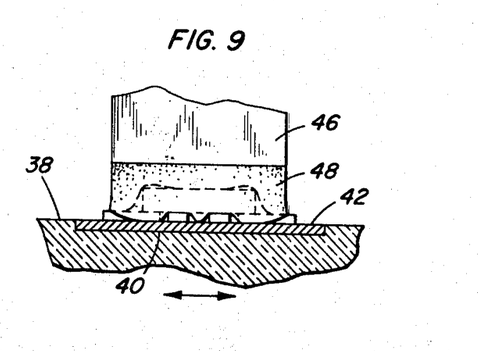
FIG. 9 is a side elevation of the assembly of FIG. 10 during ultrasonic bonding.

FIGS. 8–11 illustrate bonding in accordance with a second embodiment of the invention. In this embodiment a support or table 38 is provided which is connected to an ultrasonic horn for vibration in a direction parallel to the upper surface. It is convenient to provide a slight depression 40 in the upper surface of support 38 which conforms to the size of the substrate to which leads are to be bonded. A substrate 42 is placed in this depression and, as shown in FIGS. 8 and 9, a beam lead device 44 is positioned thereon. A plunger or clamp 46 has a tip 48 made of an elastically deformable material which is capable of deforming around device and clamping all the leads, regardless of size differences, securely to substrate 42. Plunger 46 can be hydraulic, cam actuated, solenoid actuated, or other suitable means can be employed.

Ultrasonic energy is applied and causes support 38 to vibrate in the direction shown by the arrow in FIG. 9, i.e., parallel to the surface. The bond is made in the conventional ultrasonic manner.

It has been heretofore disclosed that the heat can be advantageously applied during ultrasonic bonding with the benefit of preventing work hardening of the leads. The application of heat through a conventional ultrasonic bonding tip creates problems, however, in that the sonic properties of the tip are in part temperature dependent. This problem is eliminated in the present invention because the heat can be applied through plunger 46 and compliant medium 48.

Figure 10:
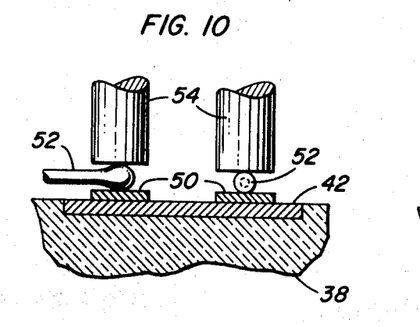
FIG. 10 is a side elevation showing all parts in place for ultrasonic bonding of a plurality of balled wire leads to a substrate in accordance with another embodiment of the invention.
Figure 11:
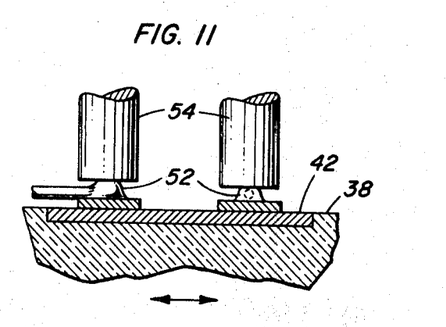
FIG. 11 is a side elevation showing the assembly of FIG. 10 during ultrasonic bonding.

The bonding of two balled wire leads to land areas on a substrate in accordance with the second embodiment of the invention is shown in FIGS. 10 and 11. The substrate 42 has two conductive land areas 50 and two balled leads 52 are positioned thereon. It will be noted that leads 52 differ substantially in size. In this instance discrete, spring-loaded plungers 54 are employed instead of compliant member 48, each plunger 54 accommodating one lead and clamping it firmly to the substrate. Bonding is carried out in the same manner as described above in connection with FIGS. 8 and 9, and heat is advantageously supplied through plungers 54. It will be appreciated that the embodiment of FIGS. 10 and 11 (and the equipment described below in connection with FIGS. 13 and 14) is suitable only for bonding wire leads or relatively large devices, and could not be used for bonding very small beam lead or integrated circuit devices. Further, it does not have the advantage of producing a bond replica (which is limited to plastically deformed media).

Figure 12:
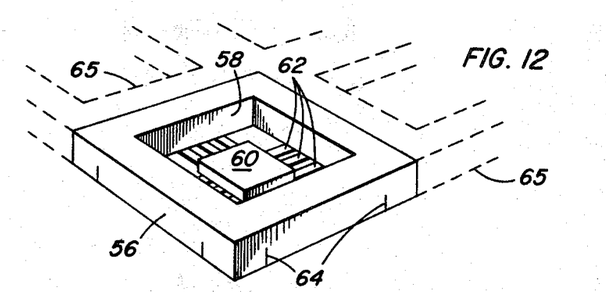
FIG. 12 is a perspective view of a lead frame for a beam lead device or devices for use in thermocompression bonding in accordance with the invention.

FIG. 12 illustrates the use of a compliant medium, particularly a film-forming metal, as a lead frame for one or more discrete beam lead devices. A rectangular frame 56 having an aperture 58 is provided, into which the device 60 is placed throupgh the bottom, the lead 62 of device 60 being lightly adhered to the underside of frame 56 by use of an adhesive. Alternatively, aperture 58 may be sized so that the body 60 fits snugly therein and is frictionally retained. Indexing marks 64 as provided on the outside of frame 56 and are designed to register with corresponding marks on the the substrate to which the device is to be attached. Similar marks (not shown) on the underside of frame 56 will facilitate the accurate placement of the device within the frame. In this manner, proper registration of each lead with its corresponding land area on the substrate is considerably simplified. The dotted lines 65 show how frame 56 may be part of a much larger frame holding a plurality of devices 60. As noted hereinabove, the lead frame may take the form of a long ribbon or tape of the compliant medium. Also, indexing may be accomplished with optical equipment by having small holes in the tape or lead frame.

Figures 13, 14:
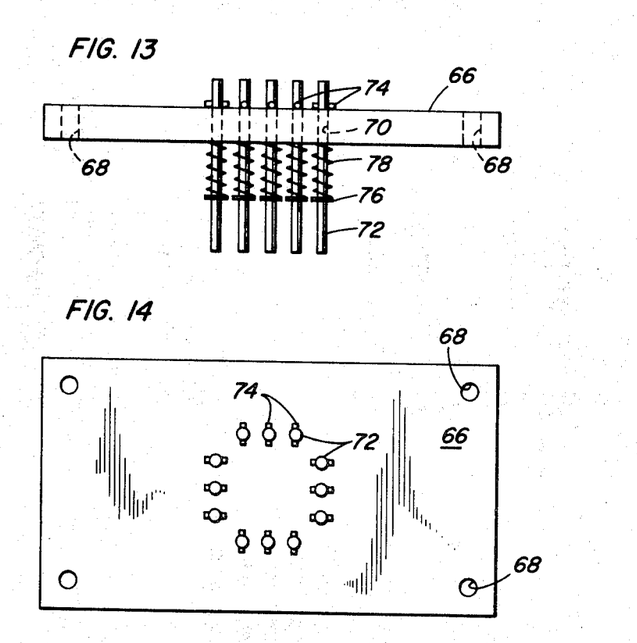
FIG. 13 is a side elevation of a jig for use in ultrasonic bonding in accordance with the invention.
FIG. 14 is a plan view of the jig shown in FIG. 13.

FIGS. 13 and 14 are elevation and plan views, respectively, of a jig for clamping the device 60 (FIG. 12) for bonding in accordance with the embodiment illustrated in FIGS. 10 and 11. A plate 66 is provided with apertures 68 for attachment in exact registry to pins on a bonding machine. A set of apertures 70 is provided equal in number to and spaced for registry with the leads on the device to be bonded. A pin 72 having a stop-key 74 near one end and a collar 76 near the other is placed in each aperture 70 with a spring 78 partially compressed between collar 76 and the underside of plate 66, stop-key 74 serving to retain each pin 72 in position.

Plate 66 is mounted in a vertically movable fixture in a bonding machine and, when the device 60 is positioned on a suitable substrate on the support, the fixture is lowered. The tips of pins 72 engage the individual leads and, as the fixture is lowered still more, springs 78 are further compressed, exerting through pins 72 a clamping force sufficient to effect bonding upon the application of heat and/or ultrasonic energy. The small size of pins 72 may preclude the application of heat directly therethrough, in which case a hot gas can be passed around the bond regions or other means can be employed.

Figure 15:
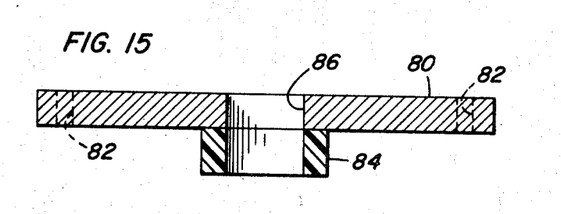
FIG. 15 is a cross-sectional elevation of an alternative embodiment of the jig of FIGS. 13 and 14.

FIG. 15 illustrates a jig useful for carrying out bonding of a beam-lead device in accordance with the embodiment shown in FIGS. 8 and 9. A plate 80 is apertured 82 for retention on the bonding machine, and a compliant medium 84 is attached permanently to the underside thereof around a central aperture 86. Aperture 86 is provided only for visual checking of registry of the substrate, device and medium 84. Compliant medium 84 is preferably an elastically deformable material such as silicone rubber or the like. Bonding is carried out in the same manner as described hereinabove. It is to be noted that jigs shown in FIGS. 13–15 may be made with any desired configuration for bonding devices, wire leads and the like to substrates of varying sizes.

Figure 16:
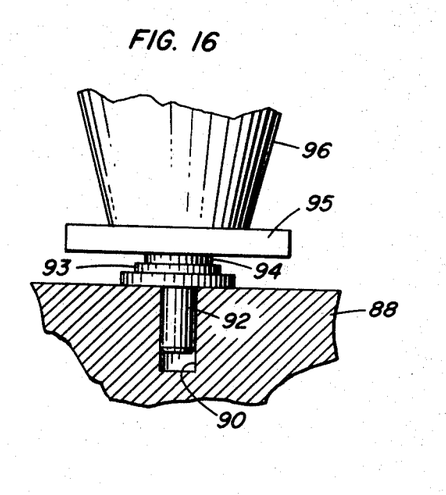
FIG. 16 is an elevation view, partly in section, showing all parts in place for the bonding of a silicon single crystal chip to a substrate in accordance with the invention.
Figure 17:
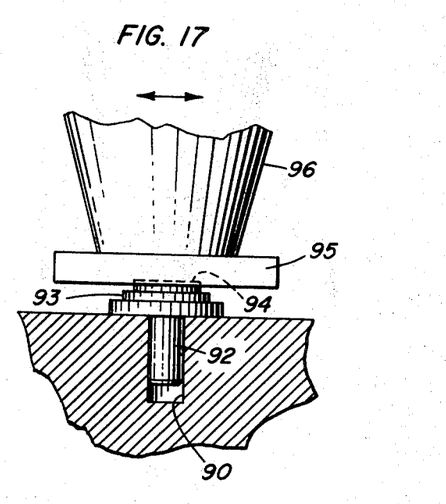
FIG. 17 is similar to FIG. 16, showing the same parts during bonding.

FIGS. 16 and 17 illustrate the preferred embodiment of the invention for bonding brittle chips cut from single crystal slices to a substrate. These figures illustrate bonding of a silicon chip to a copper stud for use as a power rectifier.

An anvil 88 has a hole 90 into which a copper stud 92 fits snugly. The head portion of stud 92 rests on the surface of the anvil. Stud 92 is usually made of copper so as to act as a heat sink and, since silicon and copper have vastly different thermal expansion properties, it is necessary to attach a suitable preform 93 to the surface thereof. Preform 93 may be molybdenum, tungsten, a silver-impregnated tungsten compact, or the like. The object thereof is to absorb the thermal stresses of the copper and prevent the active element from cracking. It is usually brazed to copper stud 92. A wafer of silicon 94 is positioned on preform 93. Wafer 94 must be metallized and plated on its lower side, but this must also be done for soldering or brazing. The compliant medium 95, which again may be a film-forming metal such as aluminum, is laid over silicon wafer 94, and the bonding tip 96 is positioned thereover and lowered so as to clamp the assembly in place. Needless to say, only a very light clamping pressure is employed. Heat and ultrasonic energy are applied for a fraction of a second, the bonding tip vibrating in the direction shown by the arrow in FIG. 17. As also shown in FIG. 17, compliant medium 95 deforms around wafer 94, and the brief application of bond energy is sufficient to bond wafer 94 to preform 93 without deformation or cracking of the wafer. Of course, total bonding energy applied will vary with the size of the wafer and the materials involved.

As a further example of this embodiment of the invention, a gallium arsenide junction laser diode was metallized with gold on both sides and bonded to an Au/Ti plated substrate. The chip measured about 10 mils square, and was less than 5 mils thick. The chip was placed on the surface of a substrate, and a piece of high purity aluminum 15 mils thick was placed thereover. An ultrasonic bonding tip was placed over the assembly and about 1.5 pounds clamping pressure was used. Heat, supplied through the bonding tip, was turned on and, 1 second later, the ultrasonic energy was applied at a level of 1 watt from a 40 kg. generator for 0.5 second. The exact temperature reached by the aluminum or the chip could not be measured, but the bonding tip reached 315° C. Existence of a true bond was confirmed by connecting the chip into a circuit through the gold on the substrate and the plate top contact; the chip functioned as a laser diode and emitted light.

Figure 18:
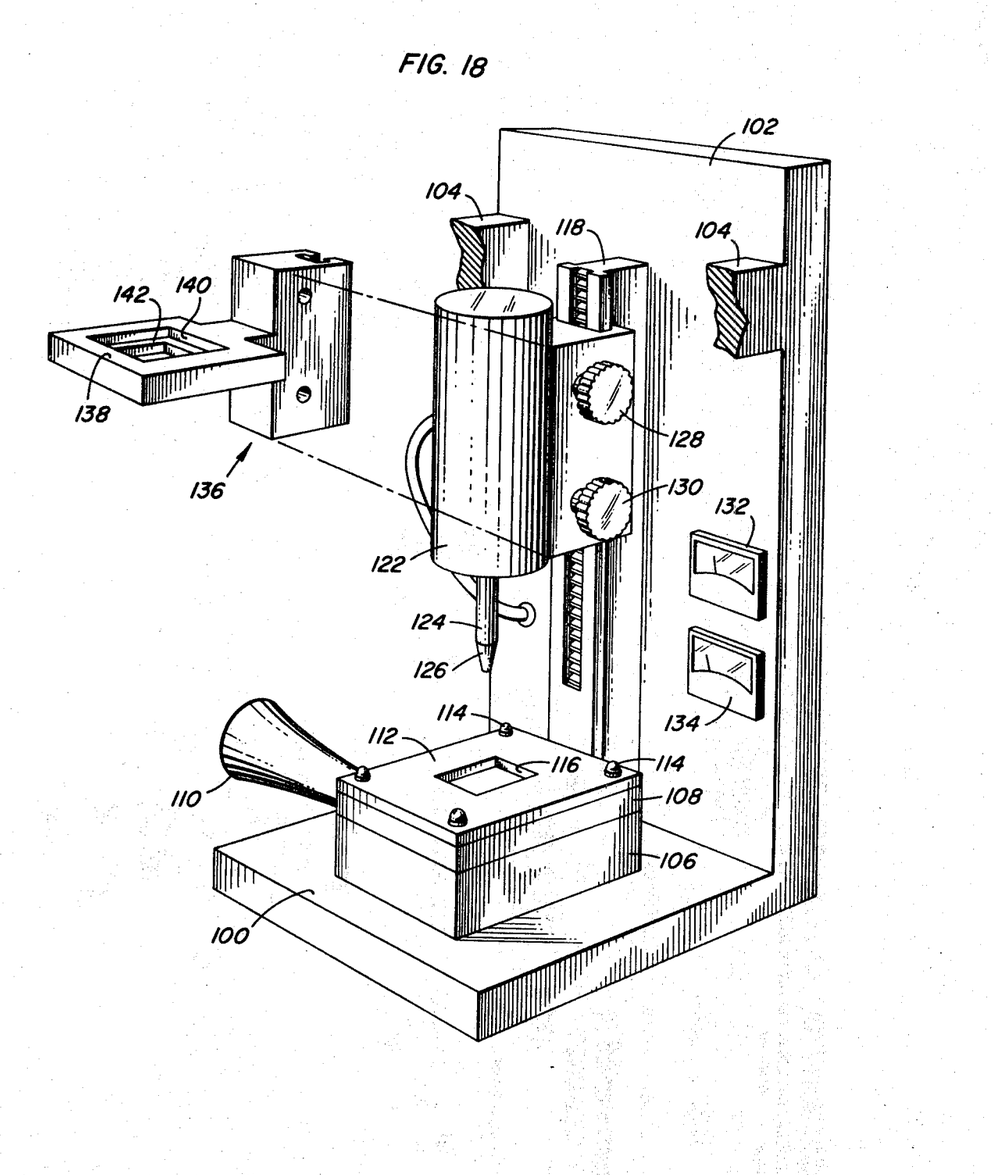
FIG. 18 is a partial perspective view of a machine capable of making either thermocompression or ultrasonic bonds in accordance with the invention.

FIG. 18 is a simplified perspective view of a bonding machine designed to carry out bonding by most of the embodiments of the invention. It will be understood that for commercial usage machines will be constructed to employ a particular embodiment rather than any embodiment.

With reference to FIG. 18, a base 100 is integral with a back portion 102 which, together, form the support for the machine. A generally U-shaped arm 104 (shown partially) extends outwardly from the back 102 and supports a suitable binocular microscope (not shown) for use by the operator in positioning the various parts. Base 100 has provided thereon a rigid table 106 on which there rests a plate 108 which is coupled to an ultrasonic horn 110 adapted to vibrate plate 108 in the horizontal plane. The ultrasonic energy source is conventional and is not shown. A second plate 112 is screwed onto plate 108 by means of four screws 114. Plate 112 is provided with a central depression 116 on the top surface thereof adapted to contain and retain a specific substrate. The reason for providing separate plate 112 is so that variously sized substrates or circuit boards can be easily accommodated.

An upright member 118 is centrally located against back 102; this is provided for the mounting of the vertically movable portions of the machine. Member 118 has a rack 120 on the forward vertical surface thereof which engages a pinion or pinions (not shown) on the vertically movable elements, much in the same manner as the barrel of a microscope is raised and lowered on its frame.

For thermocompression bonding, a hydraulic or solenoid actuated ram mechanism 122 is mounted on member 118. Ram mechanism 122 has a downwardly extending ram 124 with a replaceable tip 126. The reason for having tip 126 is, again, to accommodate variously sized devices, and different types of tips. Thus, tip 126 may be of a plastically deformable film-forming metal, it may be apertured, or it may be a flat piece of molybdenum (i.e. where a lead frame is employed). Coarse and fine adjustments 128, 130 are provided for positioning ram 124 prior to bonding. A dial 132 indicates ram pressure and a dial 134 indicates ram temperature. Power necessary for actuating and heating the ram is provided via line 136. Other controls (not shown) are provided as required.

For ultrasonic bonding in accordance with the invention, ram mechanism 122 is replaced by fixture 136. This also has a pinion gear or gears (not shown) and is adapted to be mounted on rack 120 on member 118. Fixture 136 has a simple frame 138 with an aperture 140 having an annular shoulder 142 therein. Aperture 140 and shoulder 142 are adapted to contain and retain a jig such as is illustrated in FIGS. 13–15. Threaded posts (not shown) are provided on shoulder 142 to register with the apertures (68, 82) of the jig so that the latter can be screwed down. For ultrasonic bonding in accordance with the method described in connection with FIGS. 16 and 17, of course, an ultrasonic horn would be used in place of ram assembly 122.

In bonding by either method the substrate is placed in depression 116 and the device (or leads) is positioned thereon. The operative element, either ram 124 or fixture 136 is then lowered to engage the assembly, and bonding energy is supplied by either ram 124 or horn 110. In either case, all of the leads are bonded simultaneously, and bonding is both quick and reliable. For example, a reasonably skilled worker can bond at least 12 16-lead beam lead devices to individual substrates in an hour and can maintain this rate all day without undue fatigue. The reject rate is negligible. With suitable automatic positioning equipment and large lead frames, the production rate should be much higher. For example, small holes can be punched in the lead frame at specified positions and optical equipment used to determine exact positioning. The most significant advantage is, of course, that the production rate and reliability will be just the same for a more complex device, even one having a hundred or more leads, since it is no more difficult to bond. The further advantage, when a plastically deformable metal is used as the compliant medium, of having an exact replica of each and every bond made, is a most substantial one. For a given workpiece, a series of replicas can be used as a standard against which each replica can be judged, indicating both the existence of a bond for each lead and bond quality. When the metallic compliant medium is in the form of a lead frame, there is the additional advantage of presenting the device in a readily handleable manner which is easy to position on the substrate.

It will be understood that various changes in the details, steps, materials and arrangements of parts, which have been herein described and illustrated in order to explain the nature of the invention, may be made by those skilled in the art within the principle and scope of the invention as defined in the appended claims.

What is claimed is:

1. The method of metal-to-metal bonding of a first workpiece to a second workpiece comprising:

clamping said workpieces together around the desired bond region between a support and a deformable, compliant medium, said medium being capable of deformation around one of said workpieces; and applying sufficient thermal and/or mechanical bonding energy to said bond region to deform said medium around said one workpiece and bond said workpieces.

2. The method as claimed in claim 1, wherein said bonding energy is ultrasonic vibratory energy.

3. The method as claimed in claim 1, wherein said bonding energy comprises heat and ram pressure applied through said compliant medium.

4. The method of simultaneous metal-to-metal bonding of a plurality of second workpieces to a first workpiece comprising:

positioning said first workpiece on a support;

positioning said second workpieces on said first workpiece at the desired bond areas;

clamping said workpieces together around the desired bond areas with a deformable, compliant medium, said medium being capable of deforming around said second workpieces;

applying sufficient thermal and/or mechanical bonding energy to said bond areas to deform said medium around said second workpieces and bond said second workpieces to said first workpiece; and removing said compliant medium.

5. The method as claimed in claim 4, wherein said compliant medium is a metal having an adherent oxide coating thereon, said metal deforming plastically around said second workpieces.

6. The method as claimed in claim 4, wherein ultrasonic vibratory energy is applied through said compliant medium to said bond areas.

7. The method as claimed in claim 4, wherein thermocompression bonding energy is applied through said compliant medium to said bond areas.

8. The method as claimed in claim 4, wherein said compliant medium deforms elastically around said second workpieces and ultrasonic vibratory bonding energy is applied through said support to said bond areas.

9. The method as claimed in claim 4, wherein said compliant medium comprises pins corresponding in number and position to each said second workpiece, said pins accommodating variously sized second workpieces, and said bonding energy comprising ultrasonic vibratory energy applied through said support.

10. The method of simultaneously bonding a plurality of small leads to the metallic land areas of a substrate comprising:

positioning said substrate on a support;

positioning said leads on the land areas of said substrate at desired bonding areas;

positioning a deformable, compliant medium on top of said leads over the desired bonding areas;

supplying heat and ram pressure against said compliant medium with sufficient force to deform said medium around said leads and bond said leads to said substrate; and removing said compliant medium.

11. The method as claimed in claim 10, wherein said compliant medium is a metal having an adherent oxide film thereon.

12. The method as claimed in claim 10, wherein said leads are part of a beam lead semiconductive device, and said compliant medium is a hollow preform of a metal having an adherent oxide film thereon.

13. The method as claimed in claim 10, wherein said leads are part of a beam lead semiconductive device, and said compliant medium is a flat sheet of metal substantially thicker than said device and having an adherent oxide film thereon.

14. A method of bonding a multileaded semiconductive device to the metallic lands of a substrate comprising:
  positioning said substrate on a support;
  positioning said device on said substrate with said leads in registration with land areas of said substrate;
  positioning over said leads and around said device a compliant preform the upper surface of which extends substantially above said device, said preform being a deformable metal or alloy having a tough, adherent oxide film on the surface thereof;
  supplying heat and ram pressure against the upper surface of said preform with sufficient combined thermal and mechanical energy to effect a thermocompression bond between each of said leads and said lands, said preform deforming around said bond areas but said ram not touching said device; and
  removing said preform.

15. The method as claimed in claim 14, wherein said bonds are made without substantial deformation of said leads.

16. The method of bonding a brittle piece of single crystal material to a substrate, said material having at least one metal coated surface, that comprises;
  positioning said substrate on a support;
  positioning said piece of single crystal material on said substrate with the coated surface adjacent thereto;
  positioning over said piece of material a compliant medium capable of deforming therearound;
  clamping said substrate, single crystal material and compliant medium together with an ultrasonic bonding tip;
  applying heat and ultrasonic bonding energy to the bond region through said compliant medium under conditions controlled to deform said medium around said single crystal material and bond said material to said substrate without damage to said single crystal material.

17. The method of simultaneously bonding a plurality of small leads to the metallic land areas of a substrate comprising:
  positioning said substrate on a support;
  positioning each said lead on a land area of said substrate at a desired bonding area;
  clamping each said lead to said land area; and
  passing ultrasonic vibratory energy through said support to said bond areas, the vibrations thereof being in a direction parallel to the surface of said substrate, whereby bonds are made between each lead and land area.

18. The method as claimed in claim 17, wherein said clamping is effected by pressing an elastically deformable medium against said leads.

19. The method as claimed in claim 18, wherein heat is applied to said bond areas through said elastically deformable medium.

20. The method as claimed in claim 17, wherein said clamping is effected by a plurality of pins corresponding in number and position to said leads, each said pin clamping a single lead in position.

21. The method as claimed in claim 20, wherein heat is applied to said bond areas through said pins.

22. The method of bonding a small workpiece to a large workpiece and checking the bond thus produced comprising:
  positioning said workpieces together at the desired bond area;
  positioning a plastically deformable compliant medium over said small workpiece, said compliant medium being substantially larger than said bond area and substantially thicker than said small workpiece;
  supplying sufficient thermal and/or mechanical bonding energy to said bond area to deform said medium around said small workpiece and bond said workpieces;
  removing said compliant medium; and
  checking the bond thus produced by examination of the impression in said compliant medium.

23. The method as claimed in claim 22, wherein said compliant medium is a deformable metal or alloy having an adherent oxide film thereon.

24. In the art of metal-to-metal bonding of a first workpiece to a second workpiece wherein the workpieces are clamped between a support and a source of thermal and/or mechanical bonding energy and bonding is effected by application of said energy to said workpieces, the improvement comprising disposing a deformable, compliant medium between said energy source and the workpiece adjacent thereto, said compliant medium being caused to deform around said adjacent workpiece upon application of said energy, and whereby a good bond can be achieved between said workpieces with less deformation of said adjacent workpiece than if said compliant medium were not present.

25. In the bonding of workpieces by ultrasonic or thermocompression techniques, wherein the workpieces are clamped together and thermal and/or mechanical energy is applied thereto, the improvement comprising clamping a plastically deformable compliant medium against one of said workpieces and applying a sufficient amount of said energy to deform said medium therearound and make said bond, whereby a replica of the bond area is formed in said compliant medium.

References Cited
UNITED STATES PATENTS 3,110,961  11/1963  Melill et al. _______ 29—493 X

FOREIGN PATENTS 467,365  6/1937  Great Britain.

JOHN F. CAMPBELL, Primary Examiner

R. J. SHORE, Assistant Examiner

U.S. Cl. X.R.

29—407, 471.3, 493

Disclaimer 3,533,155.—*Alexander Coucoulas*, Bridgewater Township, Somerset County, N.J. BONDING WITH A COMPLIANT MEDIUM. Patent dated Oct. 13, 1970. Disclaimer filed Feb. 1, 1971, by the assignee, *Western Electric Company, Incorporated*.

Hereby enters this disclaimer to claims 9, 17 and 20 of said patent.
[*Official Gazette May 11, 1971.*]

UNITED STATES PATENT OFFICE
CERTIFICATE OF CORRECTION

Patent No. 3,533,155      Dated October 13, 1970

Inventor(s) ALEXANDER COUCOULAS

It is certified that error appears in the above-identified patent and that said Letters Patent are hereby corrected as shown below:

In the specification, column 3, line 41, "2,226,424" should read --2,266,424--.

Signed and Sealed this twenty-sixth Day of August 1975

[SEAL]

Attest:

RUTH C. MASON
*Attesting Officer*

C. MARSHALL DANN
*Commissioner of Patents and Trademarks*